United States Patent [19]
Atzinger et al.

[11] 3,886,562

[45] May 27, 1975

[54] REMOTE POSITION INDICATOR FOR FOLLOW-UP DEVICES IN RECORDING SYSTEMS

[75] Inventors: Wolfgang Atzinger; Heinz Reetz, deceased, late of Munich, Germany, by Hildgard Reetz, heir-at-law

[73] Assignee: Fritz Schwarzer GmbH, Munich, Germany

[22] Filed: Feb. 8, 1974

[21] Appl. No.: 440,884

[30] Foreign Application Priority Data

Mar. 28, 1973 Germany ........................... 2315471

[52] U.S. Cl. ............... 346/32; 250/231 R; 324/100; 318/604; 318/640

[51] Int. Cl. ............................................ G01d 3/06

[58] Field of Search ........... 346/31, 32; 250/231 SE, 250/231 R; 324/100, 99 R; 318/640, 604

[56] References Cited

UNITED STATES PATENTS

| | | | |
|---|---|---|---|
| 2,885,613 | 5/1959 | Myracle et al. | 318/604 |
| 3,315,266 | 4/1967 | Lapinski | 346/32 |
| 3,392,402 | 7/1968 | Hartai | 346/31 |
| 3,399,347 | 8/1968 | Martens | 324/96 |
| 3,767,992 | 10/1973 | Edwards et al. | 318/640 |

*Primary Examiner*—Joseph W. Hartary
*Attorney, Agent, or Firm*—Joel Wall; William C. Nealon; H. R. Berkenstock, Jr.

[57] ABSTRACT

A remote-position indicator for follow-up devices in recording systems. There is disclosed a system for recording input electrical signals by positioning galvanometer pen styli on chart paper in accordance with the input signals. Each pen is mechanically linked to an optical mask. The optical mask in conjunction with an optical system provides a feedback light signal, which is converted to a feedback electrical signal for nulling the input signal.

6 Claims, 8 Drawing Figures

Patented May 27, 1975 3,886,562

REMOTE POSITION INDICATOR FOR FOLLOW-UP DEVICES IN RECORDING SYSTEMS

BACKGROUND OF THE INVENTION

1. Field of the Invention

The present invention relates generally to electrical signal recording systems. In particular, the present invention relates to such à system utilizing a remote position indicator with electrical-optical feedback in the recording of electrical signals on chart paper.

2. Description of Prior Art

In known or prior art remote-position indicators, or systems recording electrical signals, inductive receivers (transducers), bridge wire-receivers, slip-ring receivers, capacitative receivers or magnetically operated receivers are provided.

In such types of remote-position indicators, transmission efficiency of the position message is a function of transition of the control signal from a mechanical into an electromagnetic value. In inductive receivers, the difficulty or problem therefore exists that transmission efficiency can be impaired through an axle mounting (bearing) of the rotational system, through magnetic inhomogeneities of transformer material, as well as through mechanical machining efficiency of slot sides in the yoke aperture. Along with certain difficulties in production of required differential-transformers, the fact is moreover considered disadvantageous that correction of indicator movement-related tangential error is undertaken in a mechanical manner in tension of the pointer drive.

In resistance or potentiometer receivers, contact difficulties can arise between receiver and sliding track, as a consequence of soiling or rusting of conducting material. Further, appreciably pronounced attrition phenomena occur. Cleaning, calibrating and gauging must be frequently repeated. Moreover, the slide (pilot) wire has to be frequently changed.

In capacitative remote-position indicators, utlization of AC voltages requires adequate shielding of individual receivers, in order to avoid any mutual interference of parallel channels and other outward disturbances. Operational voltage and operational frequency must be kept constant. Although in such remote-position indicators, an automatic correction of tangential error can be achieved through a suitable geometrical form of the rotating-plate condensor, the difficulty exists on the other hand, in the condensor rotating-plates, that these are sensitive to mechanical vibrations and the action of electrical fields of interference.

In analogous magnetic field remote-position indicators with field plate or Hall generators, there finally exists the problem or difficulty that for achievement of exact linearity between angle of rotation and field plate stress, iron wedge (key) sides as well as pole piece sides opposite them must be ground with high accuracy at the gap. Simultaneous consideration must also be given to tangential error correction, and the axle-location of the system in relationship to the magnetic field pole must be very accurately adjusted. Taken altogether, this requires a technical production outlay. In relation thereto, the fact is considered especially disadvantageous that as a consequence of mechanical machining, homogeneity of the iron wedge (key) is interfered with, which likewise contributes to the falsifying of the measured results, as well as the residual magnetism of the ferromagnetic wedge (key). Furthermore, the arrangement is very sensitive to foreign magnetic fields, for which reason an appropriate shielding must be provided, which requires an undesirable increase in volume and weight. Furthermore, magnetic particles contained in dust can accumulate on the gap or slit and the iron wedge (key), whereby a worsening of the measured accuracy, appearing as aging, can be effected.

It is therefore the task of the present invention to provide a solution to these prior art problems and to construct a remote-position indicator avoiding the aforesaid disadvantages and difficulties to the greatest possible degree. On the one hand, accuracy of the measured value reading, in the transition from the mechanical positional value into the electrical control system, will not be impaired as far as possible. And on the other hand, an extremely light and simply constructed exemplification of a receiver can be utilized, which moreover makes possible an automatic correction of the tangential error.

SUMMARY OF THE INVENTION

The present invention pertains to a remote-position indicator for electrical follow-up devices in recording systems in rapid scribers. The angular setting of a pivoted armature of the recording system, corresponding to the pointer deflection, is converted into an electrical system, which in conjunction with a control system which is a function of the angular speed and acceleration of the pivoted armature, serves for comparison between input and output signal, as well as for the automatic correction of the output signal.

The task presented by the prior art problems is solved according to the present invention in such a manner, that a diaphragm segment is attached to the axle of the recording system, and that an illuminating device is stationarily arranged on one side of the diaphragm segment, and a light-receiver stationarily on the other side. Preferably, the diaphragm segment consists of a light-transmissive layer, on which reduced markings are provided in an optical manner; for instance, two rows of dash-type markings, the intervals of which correspond to the desired solution at a given angle of rotation and to the tangential correction. The markings can also be two counter-rotating threshold arrows, taking into account the tangential correction.

The present invention also relates to a system for recording at least one electrical input signal. The system comprises an amplifier for amplifying the signal, a galvanometer pen responsive to amplifier output, and an optical feedback system for correcting the position of the pen by generating a difference signal between the input and feedback signals.

Special advantages of the present invention, therefore, besides the simplicity sought in manufacture of the part determining accuracy of the overall regulating circuit, can be seen in the fact that because of the mechanically light construction or execution, frequency characteristics of the overall system become favorably influenced in comparison with heavier receivers or transducers. Also in the appertaining amplifier part, simplifications are made possible, because influence of amplifier-linearity is dispensed with. Furthermore, an optimal ratio can be achieved between performance imparted to the recording system and to the form of the initial signal. This is not only significant for economy in current in battery-driven instruments, but also for the smallest possible mode of construction to be sought for mobile application.

It is thus an object of the present invention to provide an improved electrical signal recording system.

It is another object of the present invention to provide an improved recording system utilizing a light feedback signal system.

Other objects and advantages of the present invention will become apparent to one having reasonable skill in the art after referring to a detailed description of the appended drawings wherein:

DESCRIPTION OF THE PREFERRED EMBODIMENTS

Figure 1:
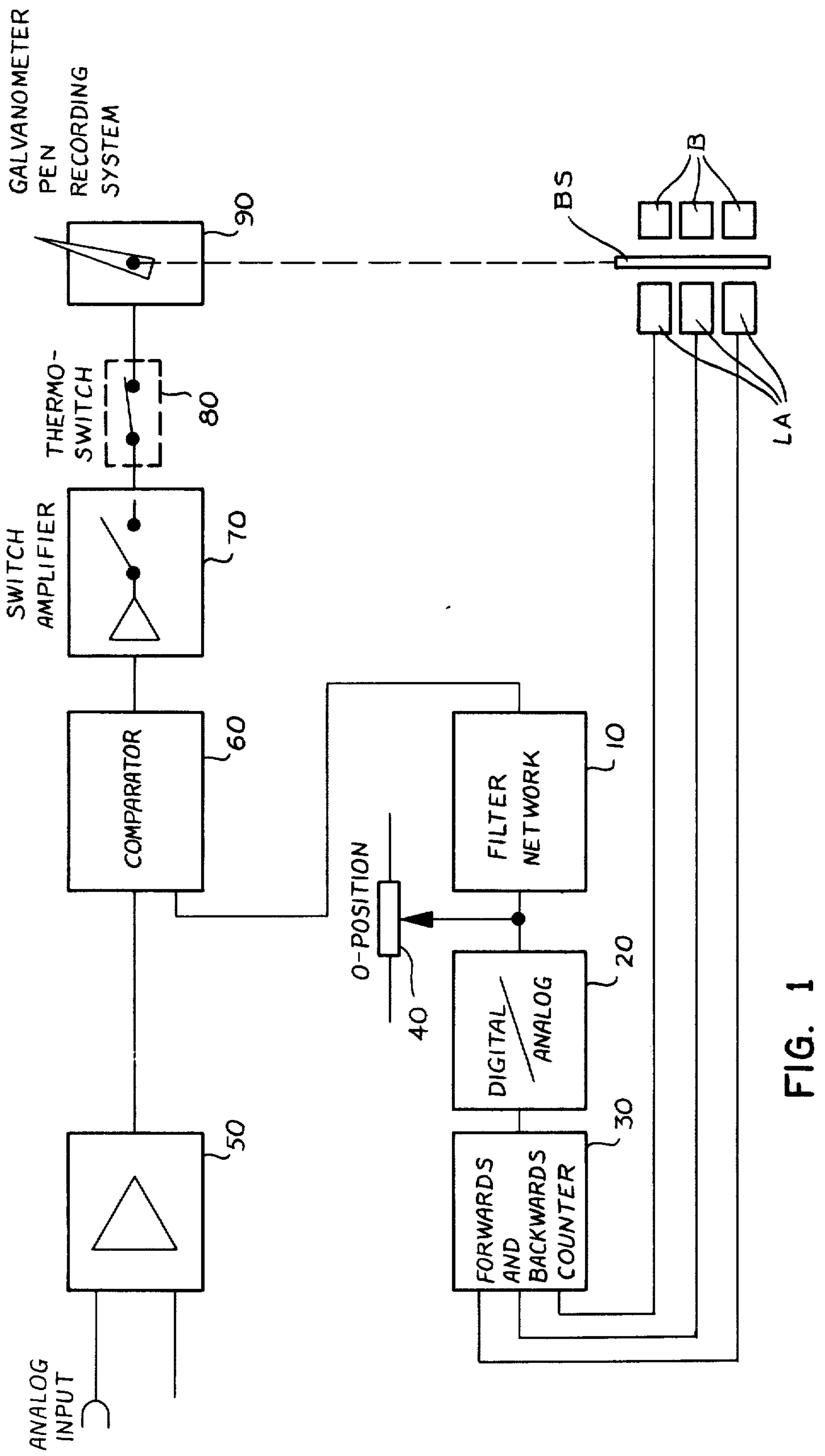
FIG. 1 depicts a diagrammatic representation of a remote-position indicator and recording system according to the invention, as well as a block diagram illustration of the electrical circuit coordinated with it.

The exemplification of a remote-position indicator demonstrated in FIG. 1, according to the invention, contains a diaphragm segment BS, which is stationarily attached with the axis of the recording system, to which the recording indicator or pointer of the recording system is likewise attached. On one side of the diaphragm segment, an illuminating device B is stationarily attached, and on the other side, a light receiver LA. As an illumination device, luminous diodes are preferably used, and as light receivers, phototransistors. Luminous or light-emitting diodes and phototransistors are standard components, well known in the electronics arts. No further detailed explanation thereof is necessary for complete understanding of the present invention.

Figures 2, 3, 4:
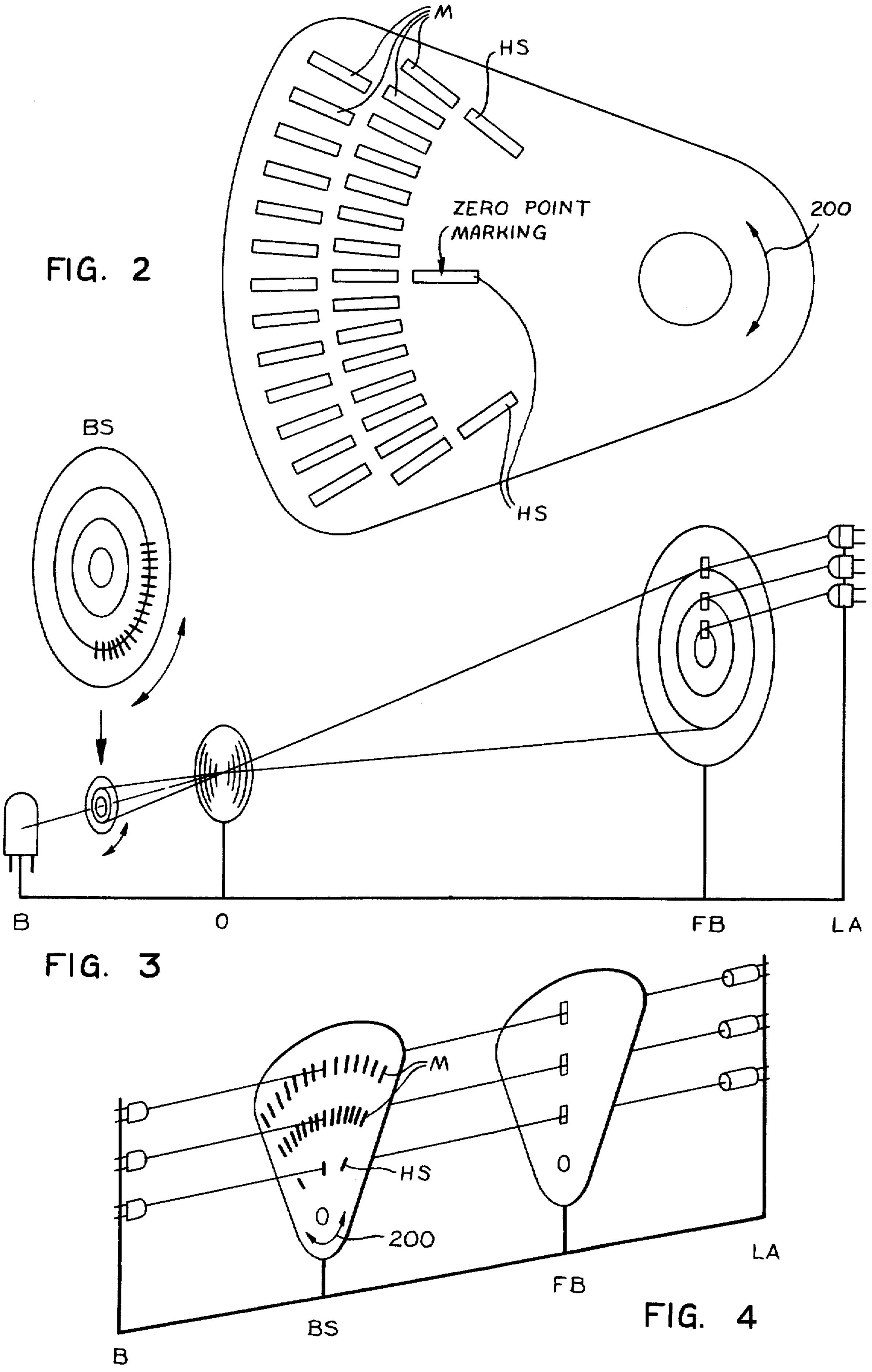
FIG. 2 depicts an exemplification of a diaphragm segment for a remote-position indicator according to the invention.
FIGS. 3 and 4 depict diagrammatic views of two practical exemplifications or alternative embodiments of a remote-position indicator in accordance with the invention.

FIG. 2 shows an exemplification of the diaphragm segment BS demonstrated in FIG. 1. This diaphragm segment consists of a transparent material such as glass or a synthetic, and carries two rows of dash-type markings M at an interval which corresponds to the desired resolution at a given angle of rotation. In this example, a third row of markings HS are provided in an auxiliary track, which mark the central point as well as also both of the end-points of the recording area sought.

Appropriately, optics O (FIG. 3) are provided, in the stationary part in which this diaphragm segment BS is submerged, for the projection of the markings on the irradiated (transmitted) diaphragm segment onto a stationary diaphragm FB, behind the diaphragm apertures of which, photodiodes or phototransistors LA are arranged as light-receivers. For each row of markings, one light-receiver is provided.

In the exemplification demonstrated in FIG. 4, the illuminating device B is constructed by means of luminous diodes, so that the projection optics can be dispensed with. On moving the diaphragm segment BS, in rotational directions 200 the light-receivers LA deliver pulse-type output voltages in a frequency proportionate to the given angle of rotation, as far as both of the first two rows of markings are concerned, while in the third row, corresponding pulse-type voltages are received, when passing through the zero point or when reaching the end-positions. Inasmuch as the marking M of the first two tracks are displaced by 90° in their phase, an additional signal can be achieved over the rotational direction, in conjunction with corresponding linkage of both of the output signals of the light-receivers in a manner known in itself. In FIG. 2, it is clear that for the clockwise rotation 200, each marking of the inner row of markings M is arranged to provide a light pulse prior to its corresponding outer-row marking. Similarly, for the other counter-clockwise rotation 200, each marking of the outer row of apertures or markings M thus provides a light pulse prior to its corresponding inner-row marking. In a likewise known manner, the front and rear faces of the pulses can also be separately operated, which leads to an increase of the resolution in relationship to the angle of rotation, (e.g. through signal differentiation).

Corresponding to the block wiring diagram in FIG. 1, these pulse-type output signals of the light-receivers are conducted to electronic forward-to-backward counter 30. If we start approximately from zero position arranged in the center of the recording area, then this counter would add up the counter pulses released through rotational movement of the recording system toward one side, until the assumed movement comes to a standstill. Now, if recording indicator or pointer 10 of the recording system would thereupon be moved in the opposite rotational movement, then counter pulses now arriving at the counter input would correspondingly reset the counter due to a directional signal which is then reversed in polarity, until it would again be located at zero on reaching the zero position.

If, in the example assumed, rotational movement would be conducted beyond the zero position, then the counter would certainly add up further pulses, but simultaneously would indicate through emission of an additional sign, that the recording pointer is now located, for instance, in the recording area beneath the zero location. On passing through the zero point, reversal of the sign is likewise accomplished.

In order to prevent any possible contingently occurring interference pulses to be added, over a rather long period of time, the zero-point marking of the third track is further utilized simultaneously to exactly reset to zero the forwards-and-backwards meter, on each zero transition.

In FIG. 1, forward-backward counter 30 provides a digital input to D/A converter 20. The analog output from converter 20 can be zero-adjusted by control 40 and it is extended to filter network 10. Output of filter network 10 is extended to one input of comparator 60. The other input of comparator 60 is extended from amplifier 50. The input to amplifier 50 is the electrical input signal to be recorded. The output from comparator 60 is extended to switch amplifier 70, the output of which drives galvanometer pen system or recording system 90 through thermoswitch (circuit breaker) 80, in a switching or pulsing manner.

Localization of recording area is achieved, at any time, moreover, through the given meter or galvanometer pen position there; which releases corresponding steps. Additionally, both of the given critical value markings become effective. Output of the meter, which conveys binary information corresponding to the given meter location which in turn exactly coincides with the armature or pointer (indicator) location of the recording system, is conducted to a digital/analog converter, which transforms this binary information into an analogous electrical measured value. This analog signal next passes through a filter network in which, in a known manner, and through one-stage and two-stage differentiation (not shown) correction signals corresponding to the speed and the acceleration of the pointer movement are obtained, which signals are conducted to the purely regulating or control signal, over adjusting elements. The signal spectrum occurring in this manner is finally conducted to an input of a comparator, which also receives the input signal. If the setting of the recording system does not now correspond to the input signal, then a difference signal occurs in this input stage, which after corresponding amplification, conducts pulse-type performance to the recording system, until the recording system has assumed the position corresponding to the input signal, and thus the difference signal in the comparator stage becomes zero.

Through suitable adjustment of the frequency characteristic in the filter network, success can be achieved in having only as much energy conducted at any given time to the recording system, as is required for assuming the new position. Hence, through the appropriate arrangement, it is assured that on suppression, for instance, of the initially accelerated armature of the recording system, no energy need be employed. Merely a very small portion of energy is required for overcoming the still residual frictional forces of galvanometer pen recording system 90.

Through this arrangement, it is further possible to let the output stages drive the recording system, in pure switching operation, so that any contingent nonlinearities in these output stages, which come about for instance through non-linearities of the characteristics of the amplifiers and constructional parts utilized, remain inoperative.

Figure 5:
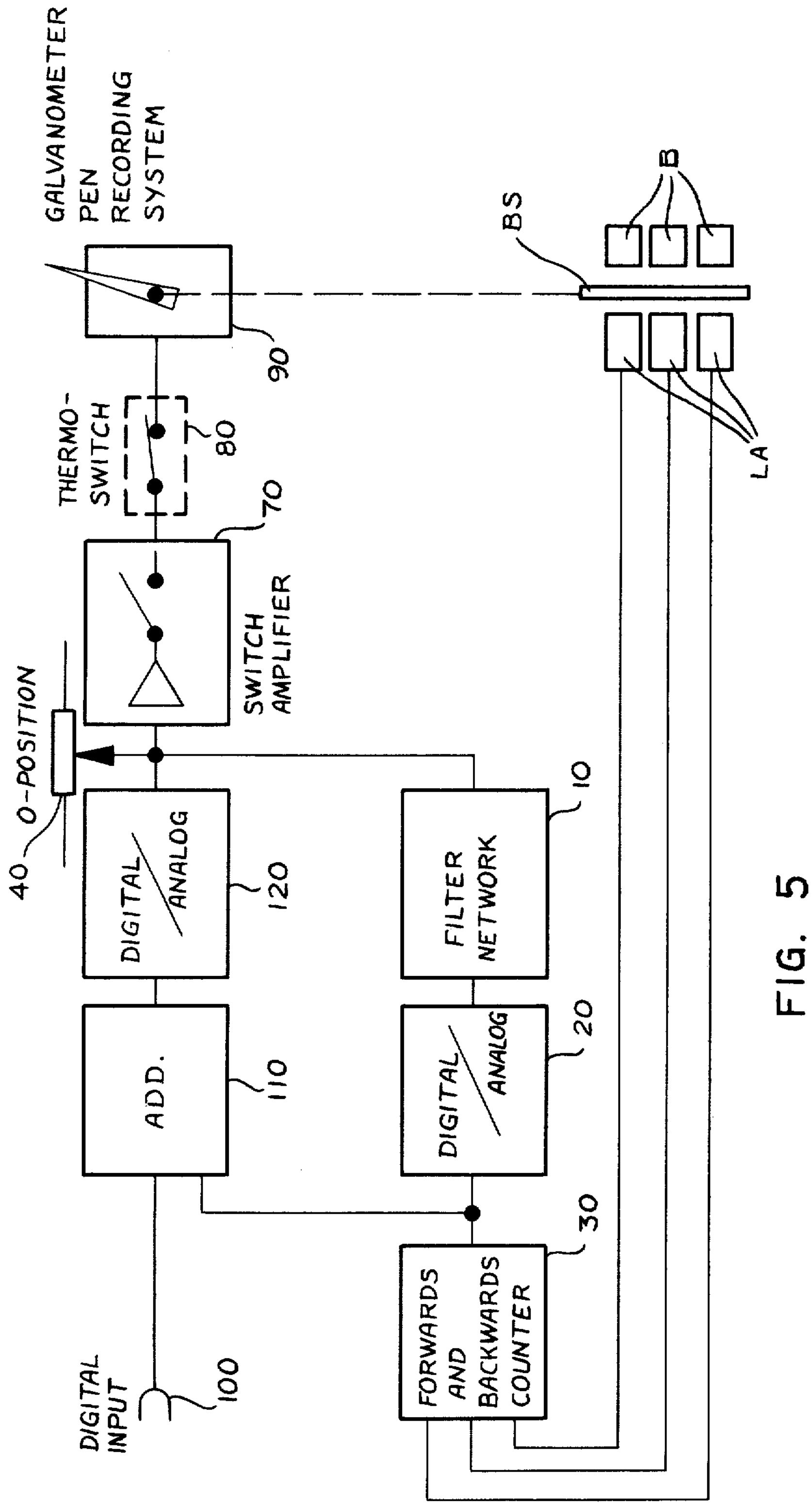
FIG. 5 depicts an alternative embodiment or exemplification of the electrical circuit, modified in comparison to FIG. 1, for remote-position indicator in accordance with the invention.

Optionally, as an alternative embodiment, the same arrangement can be utilized, for instance by a simple change for analog recording of digital values. Moreover, as is demonstrated in the block circuit diagram of FIG. 5, the digital input signal and the likewise digital output system of the forwards-and-backwards counter can likewise be digitally compared with each other in adder 110. (Digital input 100 is extended to one input of adder (10.) The resultant digital differential value is then conducted to digital/analog converter 120, the output signal of which switches the power amplifier 70. Here also, the corresponding frequency-characteristic correction makes it possible to interpose the regulating loop or curve.

The diaphragm segment can be obtained in a purely photographic way, without mechanical processing, and specifically, through purely optical reduction of a drawing with the pulse markings, produced at any time by hand in an optionally large scale. Without involving difficulties, the correction can also be introduced in conjunction therewith, of the so-called tangential or geometrical error, and specifically, through corresponding modification of the intervals of the pulse markings over to the edges of the recording area.

The achievable resolution, in the arrangement of the purely digital-operating method described is dependent on the achievable optical resolution, which is at a much higher level than the accuracy achievable with purely mechanical processing of systems of an older type of construction. Also in comparison to other types of receivers for follow-up systems, higher resolution and accuracy results herewith.

Likewise, in comparison with other types of receivers, zero point stability is strongly improved through the digital principle employed.

For adjustment of zero position, as a function of magnitudes to be displayed, an additional direct-voltage signal is fed in by zero position 40, for instance in a simple form at output of the D/A-converter.

With multiple scribers, one can either coordinate to each channel the complete follow-up circuit, or else make use of at least the D/A-converter with multiplexing.

As has already been clarified above, in conjunction with this concept only a specific amount of output energy in the form of a pulse must be conveyed to recording system 90, as is required in consideration of its inert bulk or mass, in order to assume a new position which corresponds to the change of the input signal. In this way it becomes possible, in conformity with magnitudes to be displayed, if for instance as is the case in medicine in ECG-display, the potential form requires the peak performance, necessary for high frequencies, only for a short time in each case, to expose the cooling surface only for a much lower-lying, average performance. In other words, for EKG and other similar applications, peak power for galvanometer pen movement is required in conformance to a low duty cycle. Therefore switching power output amplifiers maintains the average power dissipation quite low. An undesired overloading is efficiently prevented in conjunction therewith, by means of thermoswitch 80 introduced in the amplifier or in the vicinity of the cooling surface.

Below, it is proposed to describe an exemplification or alternative embodiment operating in a purely analog fashion, to which the same advantages apply in themselves. Only, in this system linearity cannot be increased to an equally high degree, as is possible with the digital system through simple increase or magnification of the number of digits. Also zero-position stability understandably does not attain the same high values of the digital solution.

Figures 6, 8:
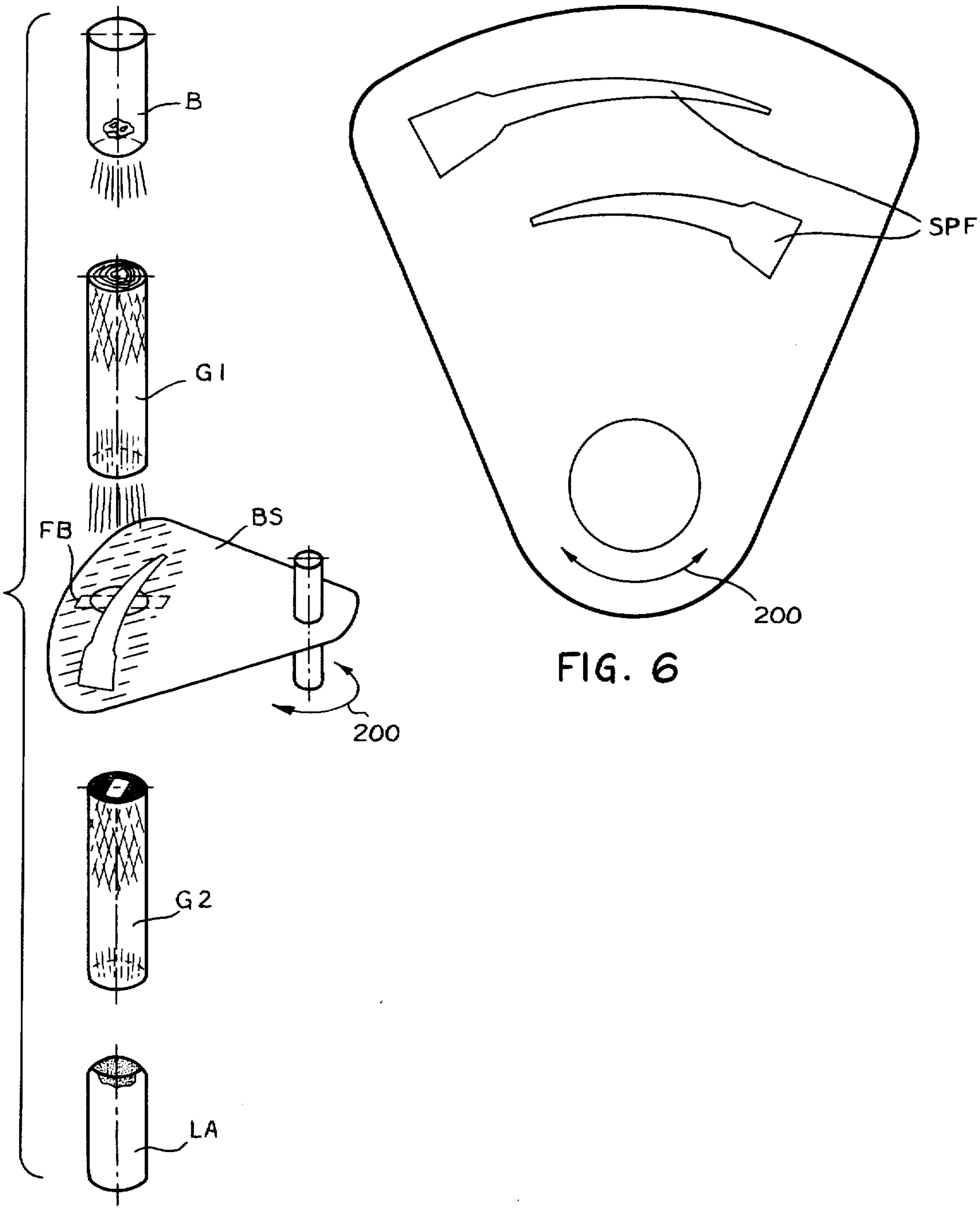
FIG. 6 depicts a further exemplification or alternative embodiment of a diaphragm segment for a remote-position indicator according to the invention.
FIG. 8 depicts a further exemplification of a remote-position indicator according to the invention, with an intensity control.

As FIG. 6 shows, the mask or diaphragm segment contains, instead of pulse markings, two tapered threshold arrows or apertures SPF arranged running counter to each other which, likewise in a photographic manner, can be transmitted by a drawing prepared by hand with a very strongly magnified scale. In these threshold arrows, geometrical or tangential correction is likewise coordinated. The irregular expansions introduced on the wide ends serve for the marking of each range-end.

Figure 7:
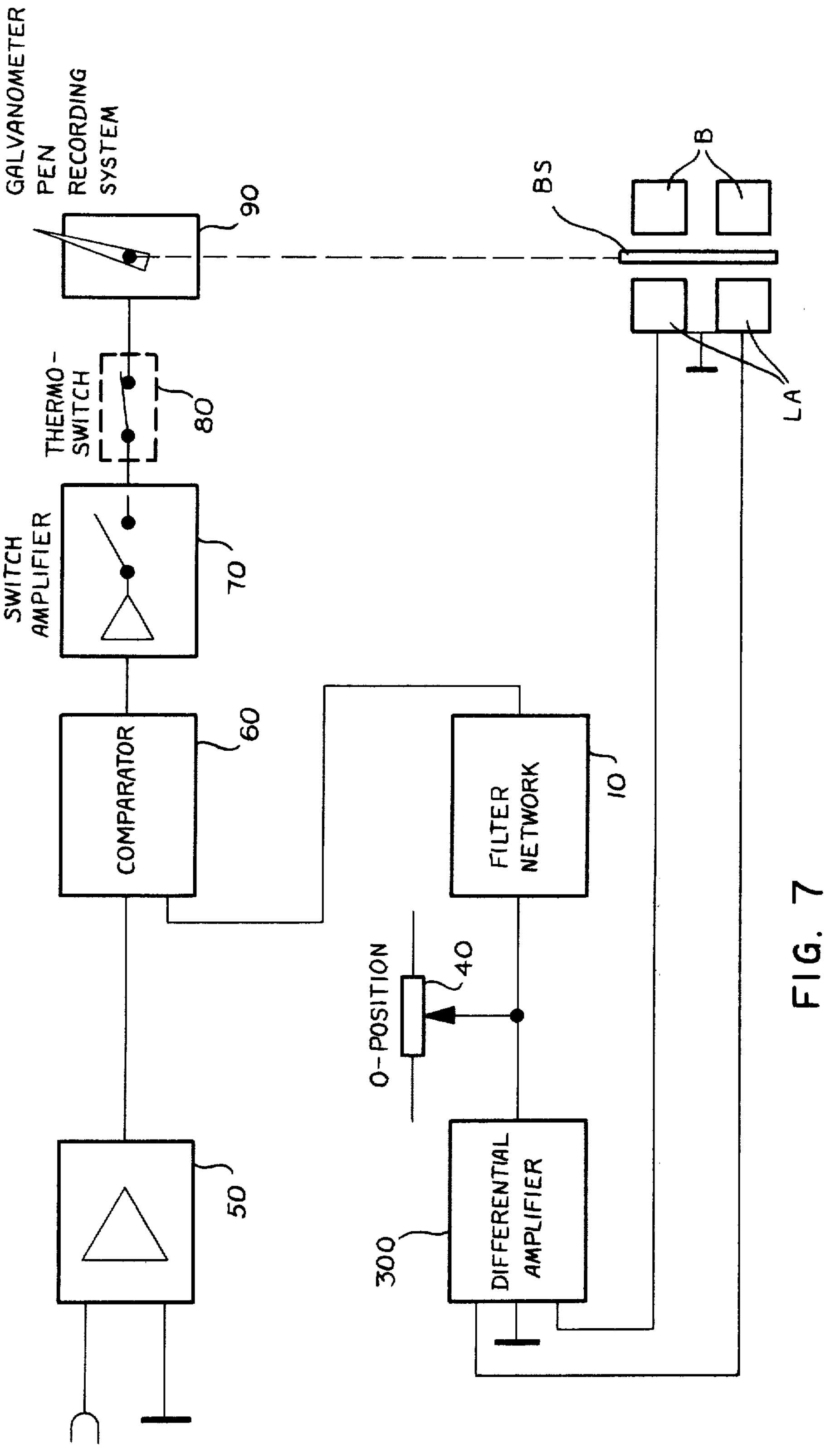
FIG. 7 depicts a modified electrical circuit, which in conjunction with the diaphragm segment in FIG. 6, makes possible an analogous procedure.

The stationarily arranged receiver part in FIG. 7 is equipped with two luminous or light emitting diodes B and phototransistors LA suitable for them. Through suitable optical means, an intensity control is achieved. The contrarotating output signals of the phototransistors are extended to differential amplifier 300. By means of this, as also through the contrarotating temperature behavior of phototransistors and luminous diodes, a good zero-position average stability is achieved. The output of the differential amplifier, in turn, passes through filter network 10 with which in a known manner, correction signals corresponding to speed and acceleration of the rotational movement are added to the remote-position signal itself. The signal so combined, to which zero-position 40 providing a zero shifting voltage can also be further conducted, finally reaches the comparison stage itself, at which the comparison to the input signal takes place as earlier described. The differential signal composed of both signals finally controls in turn, in a manner already described, the performance stage for the impulsion of the recording system. Also with this arrangement, the final stage can be passed over, purely with a switching operation, so that any linearity problems of the final stage itself drop out.

Below, it is proposed to more closely clarify a further exemplification of a remote-position indicator according to the invention, which exemplification likewise covers an intensity control (FIG. 8).

On both sides of a threshold arrow of the diaphragm segment in FIG. 8, two small rods G1, G2 of glass or some other transparent material are located, as optical means, which operate on the one hand between the illuminating device B (luminous diodes) and the threshold arrow, and on the other hand between the threshold arrow and the light receiver LA (phototransistor) as light conduction in the sense of a glass fiber conduction. Directly under diaphragm segment BS, stationary diaphragm FB is arranged. The quantity of light entering the small glass rod cross-section is conducted through repeated total reflexions along the inner walls of the small rod without lateral diffusion or stray, practically loss-free, and exits diffusely on the end of the small rod. In conjunction therewith, luminous intensity differences are equalized automatically on the input cross-section, so that at the output cross-section, a completely uniform surface-brightness exists, which corresponds to average surface-brightness over the input cross-section.

In the ray-path in front of the diaphragm segment, the device accomplishes equalization of contingent luminous intensity differences caused through blurrings and distortions in the terminal surface of luminous diodes, which is certainly neither exactly ground nor optically homogeneous, and makes available to diaphragm transmission an illumination surface of constant diameter and uniform illuminational intensity.

Shading of this illumination surface through the given limiting diaphragm aperture or slit causes on the input crossection of the second small glass rod G2, in back of the threshold arrow, a dosage corresponding to the diaphragm deflection angle, of the light quantity incident there, which is reconverted in its path, through the small glass rod, in the manner already described, into an optical intensity signal, and furthermore over the phototransistor into the electrical analog value.

In conjunction with direct objective projection of the diaphragm slit with its contour errors on the phototransistor, without prior conversion into a uniformly illuminating intensity surface of definite size, these errors, in each case according to the given location on the cover lens of the phototransistor with its localized sensitivity-deviations from the average value, would exert an all too great and non-uniform influence on the measured result, and unduly increase its errors. Through transformation of the measured values into uniformly illuminating surfaces of corresponding intensity, every error-influence on the entire surface is covered, and hence exerts the smallest possible influence on the measured result.

As was already mentioned, there exists between the digital and the analog variants or embodiments a slight difference, to the extent that the analog variant does not make possible such a high linearity as does the digital, and also its zero position stability is somewhat less. In conjunction with the use of luminous diodes and phototransistors, however, and as a consequence of the contrarotating temperature behavior of both of the semiconductor constructional elements, a satisfactory zero-point stability can be achieved by selecting suitable, interacting pairs, even in the analog embodiment.

With the exemplifications and alternative embodiments described, a much higher follow-up accuracy can therefore be achieved than with known prior art (remote-position) indicators based on some other conversion basis, and at the same time, with an appreciably smaller expenditure in production. Furthermore, a non-sensitivity exists, to the influence of electrical and magnetic interference fields, as well as to the effect of inhomogeneities and processing tolerances in the use of magnetic materials. In addition, such remote-position indicators can be produced in small and light execution, which is desirable in the interest of smaller moments of inertia of the moveable parts for the reduction of the energy conversion in conjunction with the transmission of the highest possible frequencies.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency embraced therein.

What is claimed is:

1. A remote position indicator capable of use in a recording system comprising electrical input signal means for accepting and amplifying an electrical input signal, a rotatable shaft, means for positioning said shaft by converting said signal to rotational motion of said shaft, means connected to said shaft for indicating said position an optical mask affixed to said shaft, said mask containing apertures arranged along separate paths, light source means fixedly positioned relative to motion of said shaft for shining light upon said mask and through not more than one of said apertures of each of said paths at a given time as a function of shaft position, means for detecting said shined-through light and for converting said shined-through light to electrical signals, said input signal means including means for counting said electrical signals from each of said paths and responsive to the relative times of occurrence of said feedback electrical signals for increasing and decreasing the total count, means for converting said total count to an analog signal, and means for comparing said analog signal and said electrical input signal for controlling said shaft positioning means.

2. A system for recording at least one electrical signal, said system comprising: means for amplifying said signal; means for applying said electrical signal to an input of said amplifying means; electro-mechanical means responsive to output of said amplifying means for registering said amplified electrical signal; said electro-mechanical means including chart paper means and galvanometer pen means for scribing a representation of said electrical signal on said chart paper means; optical feedback means responsive to operation of said electro-mechanical means for generating feedback light signals related to amplitude of said electrical signal; said optical feedback means including an optical mask containing apertures arranged along separate paths, light source means for shining light upon said mask and through not more than one of said apertures of each of said paths at a given time, means for positioning said mask relative to said light source means and thereby controlling said feedback light signals through said apertures; means for detecting said feedback light signals and for converting said feedback light signals to feedback electrical signals; said amplifying means including means for counting said feedback electrical signals from each of said paths and responsive to the relative times of occurrence of said feedback electrical signals for increasing and decreasing the total count, means for converting said total count to an analog signal, and means for comparing said analog signal and said electrical signal for generating said output of said amplifying means.

3. A system as recited in claim 2 and wherein said positioning means includes means for rotating said mask.

4. A system as recited in claim 2 and wherein said detecting and converting means includes phototransistor means.

5. A system as recited in claim 2 and wherein said amplifier means includes switching amplifier means for generating said output of said amplifying means.

6. A system as recited in claim 2 and wherein said comparing means generates a substantially zero output signal when said feedback electrical signal and said amplified electrical signal are substantially equal.

* * * * *